United States Patent [19]

Sucech

[11] Patent Number: 4,585,645

[45] Date of Patent: Apr. 29, 1986

[54] ALPHA ALUMINA PRODUCTION IN A STEAM-FLUIDIZED REACTOR

[75] Inventor: Steven W. Sucech, Murrysville, Pa.

[73] Assignee: Aluminum Company of America, Pittsburgh, Pa.

[21] Appl. No.: 719,559

[22] Filed: Apr. 3, 1985

[51] Int. Cl.[4] .............................................. C01F 7/02
[52] U.S. Cl. ............................. 423/625; 423/DIG. 16
[58] Field of Search ....................... 423/625, DIG. 16

[56] References Cited

U.S. PATENT DOCUMENTS

| | | | |
|---|---|---|---|
| 2,642,337 | 6/1953 | Newsome | 23/142 |
| 3,265,465 | 8/1966 | Turpin | 423/625 |
| 3,442,606 | 5/1969 | Hrishikesan | 23/142 |
| 3,565,408 | 2/1971 | Reh et al. | 423/625 |
| 4,224,288 | 9/1980 | Potter | 423/123 |
| 4,374,119 | 2/1983 | Schepers et al. | 423/625 |

OTHER PUBLICATIONS

Lussky, Edward W., "Experience with Operation of the Alcoa Fluid Flash Calciner", *Light Metals 1980*, The Metallurgical Society of AIME, pp. 69–79.

*Primary Examiner*—Herbert T. Carter
*Attorney, Agent, or Firm*—Glenn E. Klepac

[57] ABSTRACT

A process for transforming alumina hydrate into an anhydrous product comprising at least 10 wt % alpha alumina. Alumina hydrate is dehydrated, heated and transferred to a reactor where it is fluidized with steam and maintained at a temperature of about 900°–1350° C. Steam fluidization enhances crystal growth and results in a product having uniform quality and superior grinding characteristics.

20 Claims, 2 Drawing Figures

ALPHA ALUMINA PRODUCTION IN A STEAM-FLUIDIZED REACTOR

FIELD OF THE INVENTION

The present invention relates to a process involving calcination of alumina in a fluidized bed reactor. The product comprises alpha alumina and is a useful ceramic or refractory material.

BACKGROUND OF THE INVENTION

Processes for making alpha alumina are known in the prior art. The following articles describe the principles of one such process that is closely related to the present invention: William M. Fish, "Alumina Calcination in the Fluid-Flash Calciner", Light Metals 1974, pages 673–682 and Edward W. Lussky, "Experience with Operation of the Alcoa Fluid Flash Calciner", Light Metals 1980, pages 69–79. The disclosures of such articles are incorporated herein by reference to the extent that they are not inconsistent with the present invention.

Other processes for making products comprising alpha alumina are described in the following patents: Newsome U.S. Pat. No. 2,642,337; Turpin U.S. Pat. No. 3,265,465; DuBellay et al U.S. Pat. No. 3,336,109; Hrishikesan U.S. Pat. No. 3,442,606; Reh U.S. Pat. No. 3,565,408 and Potter U.S. Pat. No. 4,224,288. However, each of these prior art processes suffers from one or more serious limitations making it less than entirely suitable for its intended purpose.

Currently, rotary kiln calcination is the principal method used commercially to produce alumina with a high alpha content. Rotary kiln calcination overcomes a stickiness and agglomeration effect that occurs in high temperature (above about 1220° C.) fluidized beds of alumina. This stickiness effect, until now, has prevented the use of fluidized beds for the continuous production of aluminas with alpha content greater than about 65 wt%.

It is a principal object of the present invention to provide a process for transforming alumina hydrate into an anhydrous alumina product comprising alpha alumina wherein transformation to alpha alumina takes place in a reactor containing a bed that is fluidized with steam.

A related object of the invention is to provide a process for making alpha alumina in a fluidized bed at temperatures which may be greater than 1220° C., while avoiding the stickiness effect that has heretofore prevented operation at such temperatures.

It is an advantage of the invention that the process will yield alpha alumina without addition of aluminum trifluoride or other mineralizing agent at an intermediate step. When no mineralizing agent is added, the alpha alumina product will not, therefore, be contaminated with residual fluoride or other mineralizing agent. Fluoride is known to be detrimental for high strength ceramic applications because it promotes crystal growth during sintering.

Another advantage of the invention is that it saves heat energy compared with prior art alumina calcination processes. Energy usage resulting from practice of the present invention is estimated at about 10–30% less than for rotary kiln calcination.

An additional advantage of the invention is that the alumina produced is more uniformly calcined than with rotary kiln calcination.

A further advantage of the invention is that the process does not require increased pressures and accordingly can be retrofitted to existing fluid flash calcination systems.

Additional objects and advantages of the present invention will become apparent to persons skilled in the art from the following specification and drawings.

SUMMARY OF THE INVENTION

In accordance with the present invention, alumina hydrate is transformed into an anhydrous alumina product comprising at least about 10 wt% alpha alumina.

The alumina hydrate is initially heated in a dehydrating zone to a sufficiently high temperature and for sufficient time to obtain alumina having a residual water content below about 15 wt%. The alumina is preferably heated to an elevated temperature above about 800° C. so that residual water content is reduced below about 10 wt% and typically is about 5 wt%.

The alumina is transferred into a heating zone and there heated to an elevated temperature greater than the temperature reached by the alumina in the dehydrating zone. The heating zone is preferably located in a furnace heated by combustion of natural gas at a flame temperature of about 1649°–1677° C. Residence time in the furnace is usually short about 10 to 100 seconds).

The alumina is next transferred into a reactor separate from the heating zone and there maintained in a fluidized bed at a temperature of about 900°–1350° C. for a sufficient time to transform the alumina into an anhydrous product comprising at least about 10 wt% alpha alumina. Reactor temperature is preferably about 950°–1300° C., more preferably about 1100°–1300° C. Residence time varies from about 1 to 45 minutes, depending upon the temperature. Two particularly preferred reactor temperatures are 1250° C. and 1275° C. Reactor pressure is generally below about 1.5 atmospheres (gauge).

The reactor is fluidized with a fluidizing gas comprising principally steam. The fluidizing gas preferably comprises at least 90 volume percent steam and is usually substantially all (greater than about 99 volume percent) steam. An advantage of the present invention is that the steam-fluidized bed can be maintained at about 1220°–1300° C. for long periods of time without losing control over temperature or obtaining excessively sticky particles in the product.

The alumina is heated in the reactor for a sufficient time to obtain an anhydrous product comprising at least about 10 wt% alpha alumina. More preferably, the alpha alumina content is at least about 65 wt%, usually at least about 80 wt%. The product may have less than about 10 m²/g surface area, generally less than about 6 m²/g and sometimes less than about 3 m²/g.

The hot alumina product is discharged from the reactor into a series of cyclones where it is partially cooled. Final cooling is accomplished in a two-bed heat exchanger comprising an upper air-cooled bed and a lower water-cooled bed.

DETAILED DESCRIPTION OF A PREFERRED EMBODIMENT

Figure 1:
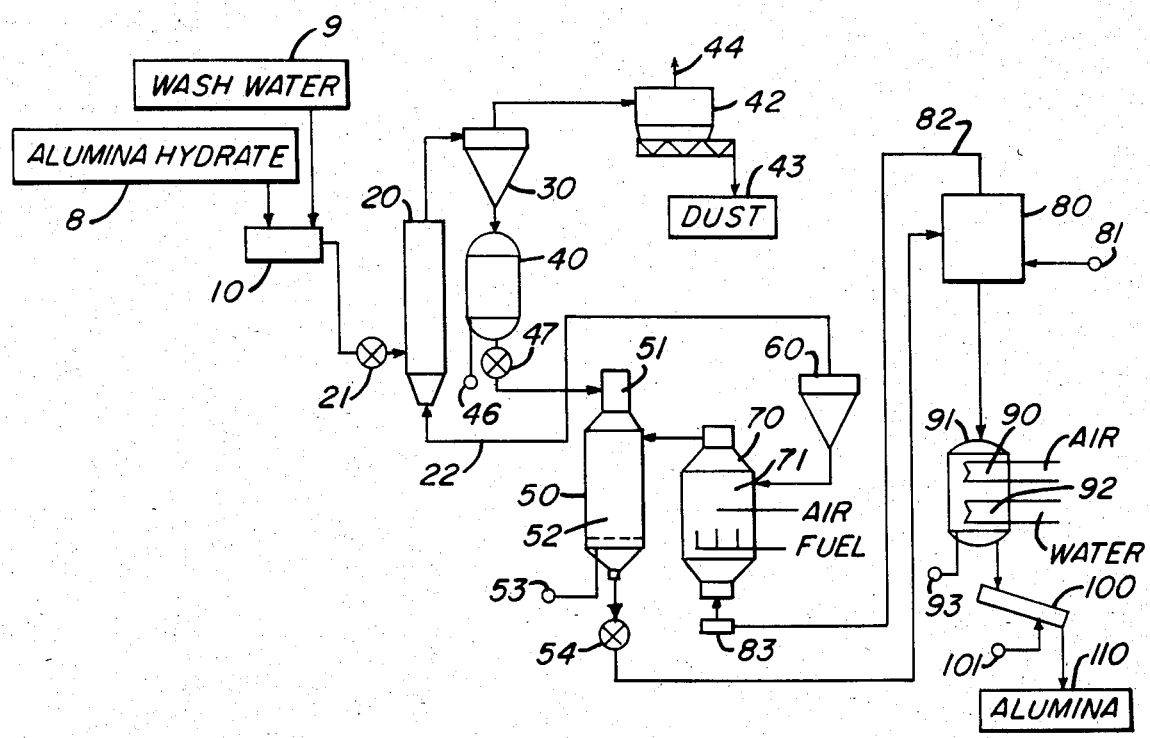
FIG. 1 is a flowsheet diagram of a preferred system for carrying out the process of the present invention.

A preferred fluid flash calcination system for carrying out the process of the invention is shown schematically in FIG. 1.

Alumina hydrate 8 from the Bayer process is filtered and washed with wash water 9 on a conventional table filter 10. The filtered alumina hydrate at this stage comprises aluminum hydroxide, Al(OH)$_3$. The filter product has both free moisture, to the extent of about 8–16 wt% H$_2$O, and chemically bound water amounting to about 34.6 wt% on dry Al(OH)$_3$. As used herein, the term "residual water content" refers to the sum of free moisture and chemically bound water. For example, alumina containing 34.6 wt% chemically bound water and about 10 wt% free moisture has a residual water content of about 44.6 wt%.

The damp hydrate is fed into a flash dryer 20 through a feed screw 21. A gas line 22 feeds a hot gas stream into the dryer 20, where free water is driven off from the alumina hydrate. The dried hydrate is transferred to a first cyclone 30 where it is separated from hot gases and water vapor and discharged into a fluidized bed dryer 40. Hot gases and water vapor from the cyclone 30 are carried to an electrostatic precipitator 42 where dust is removed to a dust bin 43 and a clean off-gas is released to the atmosphere through a vent 44. The dryer 40 contains alumina that is fluidized by air from an air source 46. The flash dryer 20, cyclone 30 and fluidized bed dryer 40 define, in combination, a dehydrating zone wherein the hydrate is heated to reduce its residual water content. Heated alumina hydrate metered out of the dryer 40 through a valve 47 has a residual water content below about 15 wt%, usually below about 10 wt% and typically about 5 wt%. Off-gas released through the vent 40 contains steam originating from dehydration and calcination of the alumina as well as from steam used as a fluidizing gas.

The valve 47 releases hydrate at a controlled rate into a reactor or holding vessel 50. The reactor 50 includes a cyclone portion 51 and a lower portion 52 containing a fluidized bed of alumina. A steam source 53 fluidizes alumina in the reactor 50.

Hydrate released into the cyclone portion 51 contacts a hot gas stream which partially calcines the hydrate and carries it to a second cyclone 60. There, solids are separated from the hot gas and transferred into a furnace 70. Hot gas separated from the solids in the second cyclone 60 may conveniently be returned through a gas line 22 into the flash dryer 20.

In the furnace 70, fuel is burned in a series of peripherally located burners directly into a heating zone 71 containing a suspension of alumina. Residence time in the furnace 70 is short (about 10–100 seconds). The furnace 70 is preferably heated by combustion of natural gas at a flame temperature of about 1649°–1677° C. (3000°–3500° F.). The furnace 70 may also be heated by combustion of other fossil fuels or by electric heater means. The furnace 70 heats alumina in the heating zone 71 to an elevated temperature above about 800° C. An alumina-gas suspension passes from the furnace 70 into the cyclone portion 51 of the reactor 50. Solid alumina particles separated in the cyclone portion 51 drop downwardly into the fluidized bed in the lower portion 52.

The fluidized bed is maintained at a temperature of about 900°–1350° C., usually about 950°–1300° C., and preferably about 1100°–1300° C. An advantage of the present invention is the ability to maintain temperatures above about 1220° C. in the fluidized bed without losing control over temperature. Two particularly preferred operating temperatures in the reactor 50 are 1250° C. and 1275° C.

A further advantage of the invention is that the reactor 50 does not require increased pressure. Reactor pressure is less than about 1.5 atmospheres, usually about atmospheric pressure or slightly higher.

Alumina is maintained in the fluidized bed reactor 50 for a sufficient time to transform it into an anhydrous alumina product comprising at least about 10 wt% alpha alumina. Residence time in the reactor may be about 1 to 45 minutes, depending upon the temperature and desired alpha alumina content of the product. The reaction is usually maintained for a sufficient time to raise alpha alumina content to at least about 65 wt%, preferably at least about 80 wt%. The product may have surface area of less than about 10 m$^2$/g, usually less than about 5 m$^2$/g or even less than about 3 m$^2$/g. Characteristics of the product can be controlled by varying retention time or reaction temperature.

The fluidizing gas introduced through the source 53 is principally steam. The fluidizing gas preferably comprises at least about 90 volume percent steam, and is optimally substantially all (greater than about 99 volume percent) steam. Usage of steam as the fluidizing gas permits operation of the reactor 50 at higher temperatures than might otherwise be maintained for long periods of time and avoids collapse of the fluidized bed as a result of alumina particle stickiness at such temperatures. The steam may be superheated to a temperature above about 105° C., usually not more than about 200° C. The steam promotes crystal growth and enhances conversion to alpha alumina.

The exothermic reaction forming alpha alumina releases heat at a rate of about 133 BTU's per pound of alpha alumina formed. This heat of formation maintains alumina in the fluidized bed at an elevated operating temperature.

Hot alumina product is discharged through a valve 54 and pneumatically conveyed through a series of cyclones 80 where the product is partially cooled. An air pump 81 supplies external air to the cyclones 80. Heated air may be returned from the cyclones 80 through an air duct 82 to the furnace 70 where such heated air provides a major portion of the air required for combustion. A small auxiliary burner 83 adjacent the air duct 82 ensures proper air temperature for combustion and also provides initial heating on start-up.

Alumina is discharged from the cyclones 80 into a two-bed fluidized cooler 90. The alumina is initially cooled with an air-cooled tubular heat exchanger 91 surrounding an upper bed. Air heated here can be transferred to the air source 46 for the fluidized bed dryer 40. Alumina cooled in the upper bed is dropped into a lower bed for final cooling by a water-cooled heat exchanger 92. An air header 93 supplies air for fluidizing both beds in the cooler 90. The cooled alumina is shifted into a pneumatic conveyor 100 powered by an air source 101 and then dumped into an alumina storage bin 110.

EXAMPLES

Figure 2:
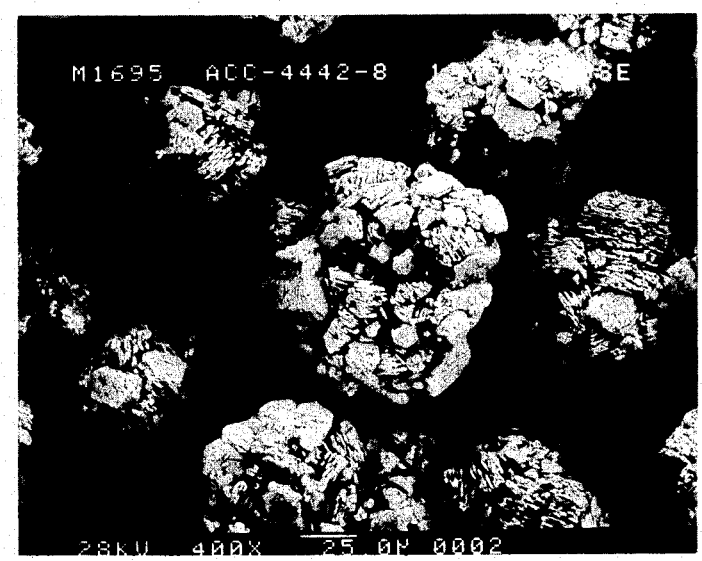
FIG. 2 is an electron microphotograph of an anhydrous alumina product made in accordance with the present invention.

The preferred process described above results in an anhydrous alumina product having high alpha alumina content. A typical product is shown in FIG. 2, which is an electron microphotograph taken at 400× magnification. This product was made by treating alumina with steam in the reactor 50 at a temperature of about 1275° C. Alpha alumina content is about 85%, based upon intensity as measured by X-ray diffraction. Surface area (BET) is about 2 $m^2/g$. The product is useful in ceramic and refractory applications calling for alumina having high alpha content. The product has superior grinding characteristics and is more uniform than alpha alumina products produced in a rotary kiln.

Alumina heated at 1225° C. for 30 minutes in a vessel 50 containing a bed fluidized with steam resulted in a product having an alpha alumina content of about 87% and BET surface area of about 4 $m^2/g$.

Alumina heated at 1270° C. for 13 minutes in a vessel 50 containing a bed fluidized with steam resulted in a product with an alpha alumina content of about 88% and BET surface area of about 5 $m^2/g$.

While the invention has been described in terms of preferred embodiments, the claims appended hereto are intended to encompass all embodiments which fall within the spirit of the invention.

What is claimed is:

1. A process for transforming alumina hydrate into an anhydrous alumina product containing alpha alumina, said process comprising
   (a) heating alumina hydrate in a dehydrating zone to a sufficiently high temperature and for a sufficient time to obtain an alumina having a residual water content below about 15 wt%,
   (b) transferring the alumina from said dehydrating zone into a heating zone and there heating the alumina to an elevated temperature greater than the temperature in said dehydrating zone,
   (c) transferring the alumina from said heating zone into a reactor separate from said heating zone and there maintaining the alumina in a fluidized bed at a temperature of about 900°–1350° C. for a sufficient time to transform the alumina into an anhydrous alumina product comprising at least about 10 wt% alpha alumina, and
   (d) fluidizing the alumina in the reactor at a pressure of less than about 1.5 atmospheres with a fluidizing gas comprising principally steam.

2. The process of claim 1 wherein the residual water content of the alumina obtained in step (a) is below about 10 wt%.

3. The process of claim 1 wherein the alumina is heated in said heating zone to a temperature above about 800° C.

4. The process of claim 1 wherein the alumina is heated in said heating zone by combustion of natural gas.

5. The process of claim 4 wherein the flame temperature of said combustion is about 1649°–1677° C.

6. The process of claim 1 wherein the alumina is maintained at a temperature of about 950°–1300° C. in said reactor.

7. The process of claim 1 wherein the alumina is maintained at a temperature of about 1100°–1300° C. in said reactor.

8. The process of claim 1 wherein the alumina is maintained at a temperature of about 1220°–1300° C. in said reactor.

9. The process of claim 1 wherein the alumina is maintained in said fluidized bed for a sufficient time to obtain a product comprising at least about 65 wt% alpha alumina.

10. The process of claim 1 wherein the alumina is maintained in said fluidized bed for a sufficient time to obtain a product comprising at least about 80 wt% alpha alumina.

11. The process of claim 1 wherein the alumina is maintained in said fluidized bed for a sufficient time to obtain a product having a surface area of less than about 10 $m^2/g$.

12. The process of claim 1 wherein the alumina is maintained in said fluidized bed for a sufficient time to obtain a product having a surface area of less than about 6 $m^2/g$.

13. The process of claim 1 wherein the alumina is maintained in said fluidized bed for a sufficient time to obtain a product having a surface area of less than about 3 $m^2/g$.

14. The process of claim 1 wherein said fluidizing gas comprises at least about 90 volume percent steam.

15. The process of claim 1 wherein said fluidizing gas is substantially all steam.

16. The process of claim 1 wherein the alumina is maintained at a temperature above about 1220° C. in said reactor.

17. The process of claim 1 wherein the alumina is maintained at a temperature of about 1250° C. in said reactor.

18. The process of claim 1 wherein the alumina is maintained at a temperature of about 1275° C. in said reactor.

19. A process for transforming alumina hydrate into an anhydrous alumina product containing alpha alumina, said process comprising
   (a) heating alumina hydrate in a dehydrating zone to a sufficiently high temperature and for a sufficient time to obtain an alumina with residual water content below about 10 wt%,
   (b) transferring the alumina from said dehydrating zone into a heating zone and there heating the alumina to an elevated temperature greater than the temperature in said dehydrating zone,
   (c) transferring the alumina from said heating zone into a reactor separate from said heating zone and there maintaining the alumina in a fluidized bed at a temperature of about 1100°–1300° C. for a sufficient time to transform the alumina into an anhydrous alumina product comprising at least about 65 wt% alpha alumina, and
   (d) fluidizing the alumina in the reactor at a pressure of less than about 1.5 atmospheres with a fluidizing gas comprising principally steam.

20. The process of claim 19 wherein the alumina is maintained at a temperature above about 1220° C. in said reactor.

* * * * *